United States Patent [19]

Lundtoft

[11] 3,894,462

[45] July 15, 1975

[54] CLAMP ELEMENT FOR CLAMPING ON A ROTATABLE SHAFT

[75] Inventor: Børge Lundtoft, Fruens Boge, Denmark

[73] Assignee: A/S Haustrups Fabriker, Odense, Denmark

[22] Filed: July 10, 1974

[21] Appl. No.: 487,142

[30] Foreign Application Priority Data
July 10, 1973  Denmark............................. 3833/73

[52] U.S. Cl. ....................... 83/665; 83/676; 83/698
[51] Int. Cl. .............................................. B26d 7/26
[58] Field of Search ............ 83/698, 675, 676, 665; 51/206.4, 206.5, 209 R

[56] References Cited
UNITED STATES PATENTS

| | | | |
|---|---|---|---|
| 2,491,976 | 12/1949 | Hauser.............................. | 83/665 X |
| 2,625,224 | 1/1953 | Garrett............................. | 83/665 X |
| 3,246,555 | 4/1966 | Finlay.............................. | 83/665 |
| 3,501,280 | 3/1970 | Myers............................... | 83/676 X |

*Primary Examiner*—Frank T. Yost
*Attorney, Agent, or Firm*—Diller, Brown, Ramik & Wight

[57] ABSTRACT

The invention relates to a clamp element for clamping onto a rotatable shaft and includes a ring adapted to be mounted on the shaft. In the inner surface of the ring two tongues are cut, the tongues extending along a portion of the inner circumference of the ring and each of the tongues being at one end integral with the remaining portion of the ring and at the other opposing ends free, with these free ends of the tongues being bolted together by means of a bolt arranged in a bore extending in the plane of the ring, and the clamp element thereby being clamped on the shaft.

9 Claims, 3 Drawing Figures

CLAMP ELEMENT FOR CLAMPING ON A ROTATABLE SHAFT

This invention relates to a clamp element particularly adapted for being clamped onto a rotatable shaft and being constructed to support articles, such as tools, for rotation together with the shaft. The clamp element is primarily in the form of a ring having flat end surfaces with a bore therethrough defined by a wall extending substantially at right angles to the flat end surfaces and adapted to engage a shaft so as to position the ring on the shaft. In the past difficulties have been encountered in the mounting of clamp elements of this type in fixed relation on a shaft. It is conventional to form one or more bores in the ring and to provide these bores with threads wherein retaining screws may be threaded through the bores into engagement with the shaft received in the hole of the ring. Such an arrangement is deficient in that the ring becomes deformed by the tension of the screws so that the hole for the shaft is no longer cylindrical but assumes an oval cross section. Further, this elastic deformation of the ring results in that originally flat surfaces, for example end surfaces of the ring, become distorted so that they no longer are even and no longer maintain the original angular position in relation to the axis of the ring. For example, surfaces which originally are at right angles to the axis of the ring will be disposed in slanted relation to the axis.

Attempts have been made to obtain an equalization of the pressures exerted by the screws by using several screws thereby obtaining a better distribution of the tensions along the ring. Undesirably this requires that more screws must be loosened in order to loosen the ring from the shaft so that the work that is connected with the replacement of a ring on the shaft will be increased and necessarily require more time.

It has been proposed to eliminate the foregoing disadvantageous constructions by creating a tongue on the inner side of the ring, which tongue is defined by a radial cut extending from the wall of the hole of the ring and a cut extending generally coaxial with the wall of the hole with the latter cut terminating remote from the radial cut in an axial bore. For cooperating with this tongue there is in that part of the ring that lies outside of the wall of the hole and the coaxial cut, a radial internally threaded bore wherein a screw may be threaded so as to engage the tongue adjacent that end thereof defined by the radial cut inwardly towards the shaft on which the ring is mounted. The strain that occurs in the shaft as a result of the fastening of the ring is dispersed over a large area of the surface of the shaft through the tongue with this area also extending circumferentially of the shaft. With this arrangement, if desired, a single screw may be utilized and thus the ring can be removed by merely loosening that single screw. However, frequently, with this arrangement the ring is not sufficiently securely fixed to the shaft so that it may be necessary to form a plurality of such tongues together with their associated radial threaded bores and screws, the tongues and radial bores being spaced circumferentially about the hole in the ring. With this arrangement one can attain a more secure attachment of the ring to the shaft, but at the same time, the number of screws is increased so that one has to undo more screws in order to remove the ring from the shaft.

In still another method of clamping a ring to a shaft, the ring is provided with a radial cut extending to the outer circumference of the ring and the ring has been drilled normal to the cut with a portion of the drilled hole in the ring on one side of the cut being internally threaded so that a screw may be utilized to clamp the two portions of the ring together. This arrangement provides a relatively even distribution of the strain around the circumference of the shaft, but this arrangement has the disadvantage in that there is an interruption of the surface of the ring on which elements supported by the ring are normally attached.

When the ring is utilized as a knife hub there is a further disadvantage in that the ring cannot be reproducibly manufactured so that a circular knife can be mounted on the ring without there being a certain axial displacement of the knife relative to the ring and the eccentric mounting of the knife with respect to the axis of the shaft. Therefore, with these arrangements it is necessary that the knife be applied to the knife hub after which the knife is ground or sharpened. This arrangement is particularly impractical for many reasons including the fact that the machine in which the knife is utilized has to be stopped during the sharpening operation, the particles which are removed during the sharpening operation can damage the machine of which the knife is a part, and because the sharpening of the knife in a workshop can be done better and cheaper than it can be done at the machine.

In view of the foregoing, it is an object of the invention to provide a clamp element of the type described above wherein an object, such as a tool, can be mounted on a shaft in such a way that the tool has a minimum runout both axially and radially and wherein the clamping element can be released from the shaft by releasing a very simple connection. At the same time, the construction of the ring is such that there is little possibility that the shaft will be damaged by the clamping thereon of the clamping element.

In accordance with this invention, the clamping element has two tongues cut in the ring with each of the tongues being primarily defined by a portion of the inner wall of the ring defining the hole, a cut extending radially to that wall, a cut that extends coaxially with part of the wall, and a curved surface which is made by generaterices disposed parallel to the axis of the ring, the radius of curvature of which is smaller than that of the wall and wherein the curved surface interconnects the two cuts. The cut which is disposed at right angles to the wall is common to the two tongues and there are axial bores formed in the ring at the ends of the cuts extending coaxially with the wall remote from the radial cut and at the outer end of the radial cut. Further, there is at least one bore extending generally normal to the radial cut in each of the tongues with the bore in one of the tongues being internally threaded and adapted to have threadedly engaged therein a screw which draws together the tongues towards each other across the radial cut. With this arrangement the strains that appear in a shaft on which the ring is clamped will be dispersed over three comparatively large areas of the surface of the shaft with a considerable portion of the tongues touching the shaft. It will be apparent that when the tongues have an adequate length, a large portion of their length will touch the shaft with the risk that the tongues would damage the shaft being greatly reduced.

Furthermore, it will be seen that a clamp element of the type described immediately above can be adequately secured to a shaft for adjustment along the shaft and can be centered in relation to the axis of the shaft with an accuracy that was previously unavailable in that shifting and eccentric mounting of the clamp element with respect to the shaft is substantially avoided while at the same time the clamping element is well suited to absorb side forces. Further, the mounting of annular tools on the ring is greatly facilitated in that the surface on which the tools are mounted is uninterrupted and not distorted.

To further diminish the risk of the tongues should have the ends thereof engage the shaft in a manner to damage the shaft, the two corners of the tongues where the tongues oppose one another can be rounded. With this relationship, there can be a very strong clamping of the shaft by the ends of the tongues without damage to the shaft.

The clamping action of the clamping element is positive in that the two tongues both stretch themselves around approximately one quarter of the inner circumference of the ring. Hereby it has been shown in practice that an adequate equalization of the strains in the shaft following the clamping of the clamping element thereon is achieved.

Another feature of the clamping element is that there are axial bores extending through the ring at the ends of the cuts extending generally concentric with the wall and at the other end of the radial cut. Hereby the shaping of the tongues of the clamping element is made easier while at the same time the tongues becomes adequately flexible relative to the remaining part of the ring.

A still further feature of the clamping element of this invention is that there may be permanently secured on the outer surface of the ring a tool, such as a knife. The ring construction provides for a simplified construction of the tool and the ring, which functions as the tool hub, in that these two parts, unlike what has been done in the past, can be manufactured as a single unit. The reason for this is that since there can be an accurate positioning of the clamping element on the shaft it becomes unnecessary to grind the tool after it has been put on the hub. Hereby the tool can be formed in such a way that its lifespan mainly corresponds to that of the hub.

In a preferred embodiment of the invention, the tool is in the form of a hard metal ring. Hereby it is possible to avoid grinding of the tool unless there is accidental damage to the tool.

With the above and other objects in view that will hereinafter appear, the nature of the invention will be more clearly understood by reference to the following detailed description, the appended claims and the several views illustrated in the accompanying drawings:

Figure 1:
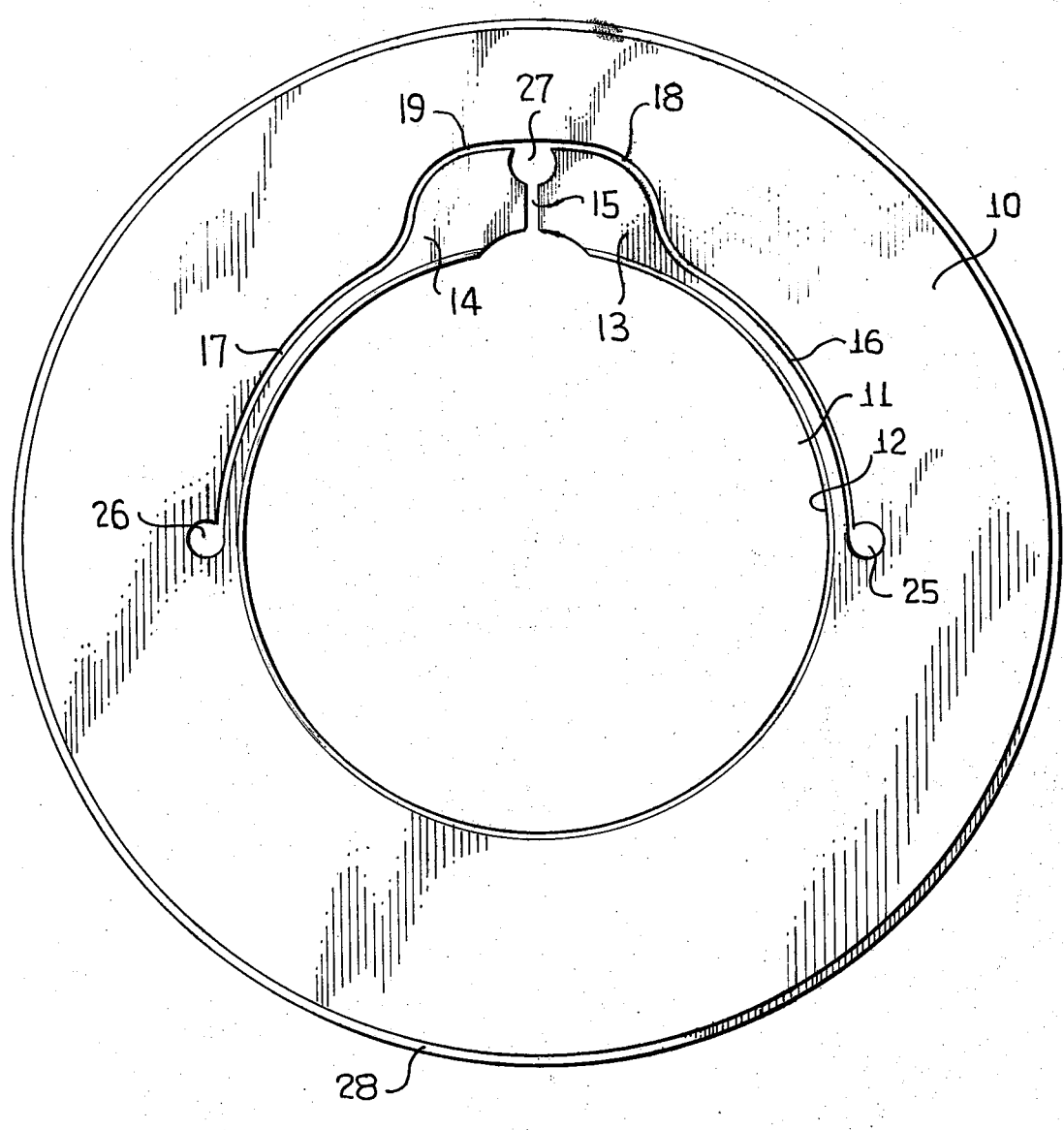
FIG. 1 is a side elevational view of a clamping element when it is utilized as a hub for a knife.

Referring now to the drawings, it will be seen from FIG. 1 that the illustrated clamping element is in the form of a knife hub and includes a ring 10 having a hole or bore 11 therethrough for receiving a shaft, the hole 11 being defined by a cylindrical wall 12.

In the inner circumference of the ring 10 there are cut two tongues 13,14 with each tongue being primarily defined by a portion of the wall 12, a radial cut 15 which extends substantially at right angles to the wall 12, a cut respectively identified by the numeral 16,17 which extends coaxially with a radially adjacent part of the wall 12, and an arcuate cut identified by the respective numeral 18,19 which connects the cuts 15 and 16 and 15 and 17, respectively.

Figure 2:
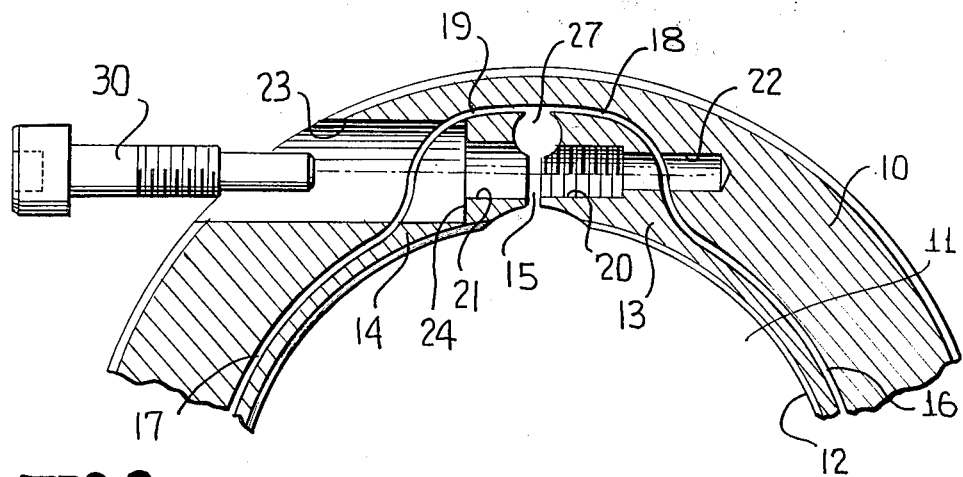
FIG. 2 is a fragmentary sectional view taken transversely of the axis of the clamping element and shows specifically the manner in which the two tongues may be clamped together.

It will be seen that the radial cut 15 is common to the two tongues 13,714. It will also be readily apparent, particularly with reference to FIG. 2, that the tongues 13,14 are of the greatest thickness adjacent the cut 15. An internally threaded bore is formed in the tongue 13 beginning at the end thereof adjacent the cut 15 and this bore 20 terminates in a smaller diameter bore 22 which extends across the cut 18 and into the main portion of the ring 10. A bore 21 is formed in the tongue 14 in alignment with the threaded bore 20. A further and larger diameter bore 23 is formed in both the main portion of the ring and in part of the tongue 14, the bore 23 terminating at the bore 21 and defining at the intersection of the bores 21,23 an annular shoulder 24. A screw 30 is passed into the bore 23 with a reduced end portion thereof extending through the bores 21 and 20 into the bore 22 so as to assure alignment of the screw 30 with the bores 20,21. It is to be noted that the screw 30 will extend across the cut 15 substantially normal thereto and that when applied the head of the screw 30 will abut against the shoulder 24 so that as the screw 30 is further threaded into the threaded bore 20, the tongues 13,14 will be drawn together.

Figure 3:
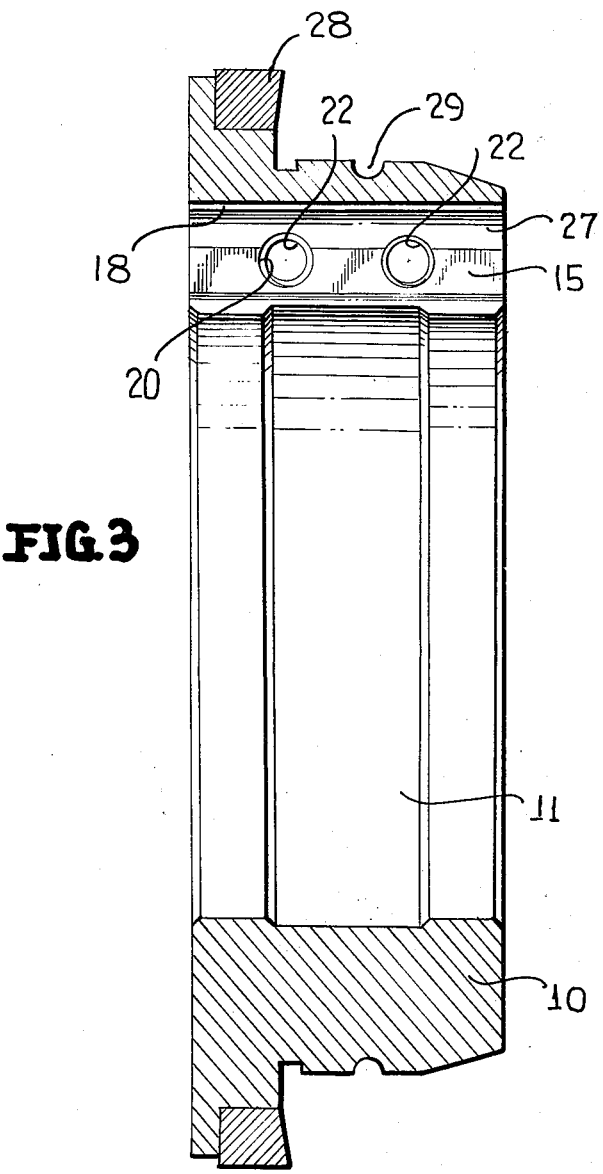
FIG. 3 is a longitudinal sectional view through the clamping element of FIG. 1 and shows further the details thereof.

At this time it is pointed out that while the tongue 15 has been illustrated in FIG. 3 as having two internally threaded bores 22 so that two screws 30 may be utilized, it is to be understood that in many instances a single screw will suffice and thus only a single set of the bores 20–23 will be required.

It is to be understood that the knife hub is to be attached to a shaft which will be positioned within the hole 11 while the screw 30 is in its released position and the tongues 13,14 assume their normal positions. After the knife hub is properly adjusted on the shaft (not shown) the screw 30 will be introduced into the respective bores 20–23 and tightened so that the tongues 13,14 are drawn towards one another and pressed against the shaft with the spacing between adjacent ends of the tongues initially defined by the radial cut 15 being diminished. It is to be understood that the tongues 13,14, when properly designed, and taking into consideration the stiffness of the material and the strength of the material from which the ring 10 is formed, will lay against the shaft for a large part of each tongue while at the same time a large part of the wall 12 that is diametrically opposite to the cut 15 will be pressed against the shaft. The ring 10 will thus be pressed on the shaft in three areas, these areas being the outside walls of the tongues 13,14 and the area of the ring diametrical to the cut 15.

It has been proven that with the foregoing arrangement a very good grip can be obtained on the shaft. Further, it has been found that the strains that appear on the surface of the shaft as a result of the securement of the ring 10 thereto appear over a large area with the result that the ring or the knife hub may be secured to the shaft without damaging of the shaft in the area of the securement.

It will also be apparent that the knife hub can be clamped onto the shaft or released therefrom utilizing only a simple clamping element, such as a single screw 30.

It is to be understood that the ends of the tongues 13,14 at the corners thereof defined by the inner section of the radial cut 15 with the wall 12 could dig into the shaft and thus damage the shaft. Accordingly, as is apparent from FIG. 1, these corners of the tongues 13,14 are rounded off so as to eliminate any possible damage of the shaft by engagement of corners of the tongues therewith.

In order to facilitate the formation of the cuts 16,17 the ring 10 is provided at the ends of the cuts 16,17 remote from the cut 15 with axial bores 25,26, respectively, which extend the full length of the ring 10. The bores 25,26 also contribute to the flexibility of the tongues 13,14 with respect to the remainder of the ring.

In addition, the ring 10 may be provided with a further axial bore 27 at the outer end of the radial cut 15. The existence of the bore 27 facilitates the adjustment of the tongues and makes possible a comparatively large movement of the tongues towards one another in that the outer corners of the tongues will be more widely separated.

It has been proven in practice that a knife hub formed in accordance with this invention can be adjusted in a reproducible manner when clamping the same onto a shaft so that it is no longer necessary to grind the tool while the hub and knife are mounted onto the shaft. As is clearly shown in FIG. 3, the ring 10 or knife hub has permanently mounted thereon an annular knife 28. it is no longer necessary to effect grinding of the knife while it is mounted in its operating position. Thus, the undesired stoppage of the machine of which the knife is a part is avoided and at the same time, the grindings which are formed during the sharpening of the knife are not formed in the area of the machine.

It is to be understood that the ability to grind the knife in a specialized workshop permits the grinding to be effected more cheaply and at the same time more satisfactorily than is possible when the knife is ground in its working position.

It is to be understood that the knife 28 can be fixed to the ring 10 on the outer surface thereof by gluing or by means of other securing means. The outside of the ring can also be shaped to receive an associated conventional ring of the type that normally is used to direct and bring forward material which is to be cut by help of the knife 28. As is clearly shown in FIG. 3, the outer surface of the ring 10 is provided with an annular groove 29 to receive a conventional O-ring (not shown) which O-ring may be utilized as a guiding device for the cooperating non-illustrated ring.

It is also pointed out at this time that the transistion between the cuts 16,17 and the cuts 18,19, respectively, may be smoothed to a desired degree so that there is no sharp corner on the exterior of the tongues.

Although this invention is specifically adapted to be utilized as a knife hub, it is to be understood that the clamping element of this invention could equally as well be used to support other objects, especially tools that must be very accurately mounted on a shaft in such a way that they can rotate with the shaft.

Although only a preferred embodiment of the invention has been specifically illustrated and described herein, it is to be understood that minor variations may be made in the ring construction without departing from the spirit and scope of the invention, as defined by the appended claims.

I claim:

1. A clamp element particularly adapted for adjustable clamping onto a rotatable shaft and having means for supporting an object such as a tool for rotation with the shaft, said clamp element being in the form of a ring having end surfaces and an internal wall extending substantially at right angles to said end surfaces and defining a hole for the reception of a shaft, said ring having an axis, said ring being improved by two internal tongues each separated partially by cuts in said ring, each tongue being primarily defined by a portion of said wall, a cut generally at right angles to said wall, a curved cut extending generally coaxially with said wall portion, and a curved surface formed by generatrices situated parallel to said ring axis, said curved surface having a radius of curvature smaller than that of said wall, said curved surface joining said cuts, said generally right angle cut being common to said tongues, transverse bores in said tongues extending across said common cut and bolt means in said transverse bores for drawing together said tongues.

2. A clamp element according to claim 1, characterized in that those corners of the two tongues defined by said common cut intersecting said wall are rounded.

3. A clamp element according to claim 2 wherein each of the two tongues extends along approximately one fourth of the inner circumference of said ring.

4. A clamp element according to claim 3 wherein axial bores extend through the ring at those ends of the cuts extending concentrically to the wall remote from said common cut and at that end of said common cut opposite to the hole in the ring.

5. A clamp element according to claim 2 wherein axial bores extend through the ring at those ends of the cuts extending concentrically to the wall remote from said common cut and at that end of said common cut opposite to the hole in the ring.

6. A clamp element according to claim 1 wherein axial bores extend through the ring at those ends of the cuts extending concentrically to the wall remote from said common cut and at that end of said common cut opposite to the hole in the ring.

7. A clamp element according to claim 1 wherein each of the two tongues extends along approximately one fourth of the inner circumference of said ring.

8. A clamp element according to claim 1 characterized in that a tool is permanently secured to the outer surface of the ring.

9. A clamp element according to claim 8, characterized in that the tool is in the form of a ring of cemented carbides.

* * * * *